United States Patent [19]
DeLuca et al.

[11] Patent Number: 4,803,703
[45] Date of Patent: Feb. 7, 1989

[54] APPARATUS AND METHOD FOR FINE SYNCHRONIZATION OF A COMMUNICATION RECEIVER

[75] Inventors: Michael J. DeLuca, Boca Raton; David F. Willard, Plantation, both of Fla.

[73] Assignee: Motorola, Inc., Schaumburg, Ill.

[21] Appl. No.: 44,377

[22] Filed: Apr. 30, 1987

[51] Int. Cl.$^4$ ............................................. H04C 7/00
[52] U.S. Cl. .................................. 375/116; 375/111; 375/114; 370/106
[58] Field of Search ............... 375/106, 111, 114, 116, 375/118, 119; 340/146.2, 311.1, 825.44; 364/514, 517; 370/106

[56] References Cited

U.S. PATENT DOCUMENTS

| | | | |
|---|---|---|---|
| 3,662,114 | 5/1972 | Clark | 370/106 X |
| 4,382,256 | 5/1983 | Nagata | 340/825.44 |
| 4,414,676 | 11/1983 | Kraul et al. | 375/119 X |
| 4,450,558 | 5/1984 | Hampton et al. | 370/106 |
| 4,506,262 | 3/1985 | Vance et al. | 340/825.44 |
| 4,518,961 | 5/1985 | Davis et al. | 364/900 X |
| 4,663,623 | 5/1987 | Lax et al. | 340/825.44 |
| 4,680,621 | 7/1987 | Baker et al. | 375/118 X |
| 4,688,218 | 8/1987 | Blineau et al. | 370/106 |

*Primary Examiner*—Roy N. Envall, Jr.
*Assistant Examiner*—Derek S. Jennings
*Attorney, Agent, or Firm*—Winfield J. Brown, Jr.; Michael J. DeLuca; Joseph T. Downey

[57] ABSTRACT

A system and method is described for synchronizing a paging receiver decoder to receive information in the form of digitally encoded signals. The digital signals include a synchronization signal followed by message data. The synchronization signal includes a first and second portion of the synchronization signal. The decoding means is synchronized to the first portion for generating a timing signal. The decoder then measures a phase relationship between the timing signal and the second portion of the synchronization signal. The timing signal generated by the decoder is adjusted according to the phase relationship to improve the decoding of the incoming information. In a second embodiment, a second synchronization signal is transmitted for statistically improving the accuracy of the timing signal.

31 Claims, 9 Drawing Sheets

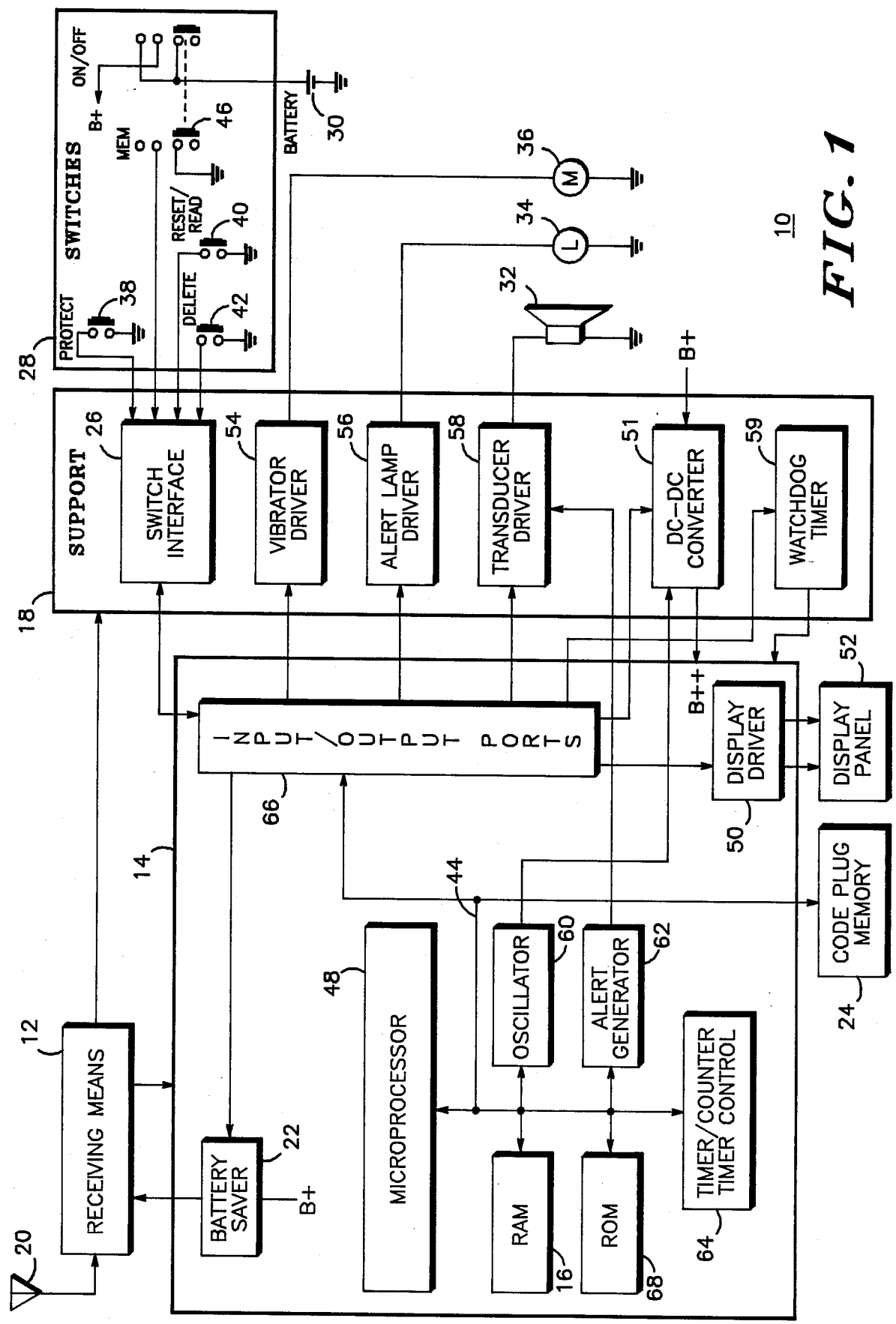

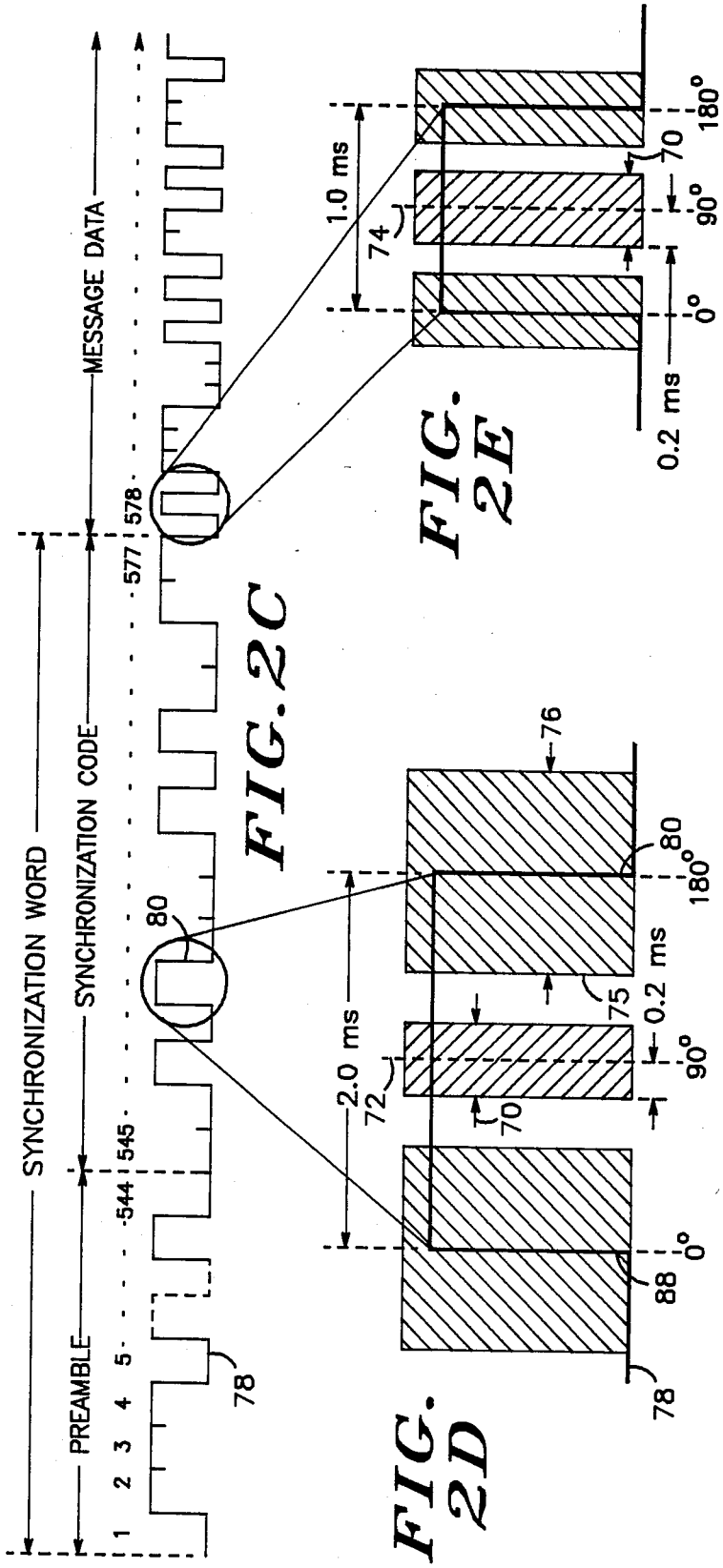

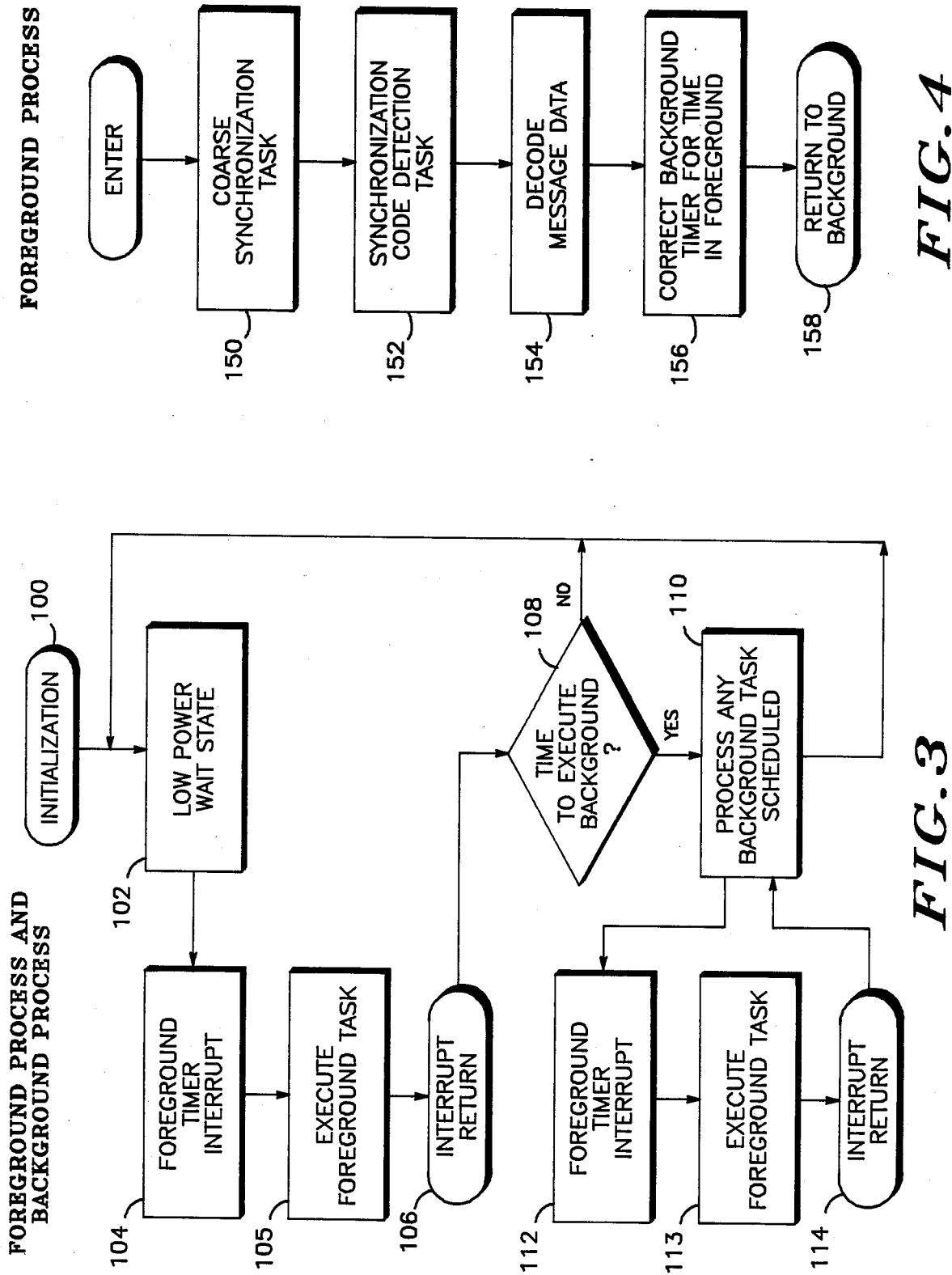

FIG. 9A

BATCH MODE
| SYNC WORD | SYNC WORD 2 | FRAME 1 | ... | FRAME 8 |

82 — SYNC WORD
83 — MESSAGE SCHEME CODE

FIG. 9B

SYNC WORD: PREAMBLE | SYNC CODE | FINE SYNC
FRAME 1: INFO WORD | INFO WORD | INFO WORD | INFO WORD

84 — SYNC WORD 2
85
400 — FINE SYNC

FIG. 9C

PREAMBLE
FIRST SYNCHRONIZATION WORD — SYNCHRONIZATION CODE
SECOND SYNCHRONIZATION WORD — FINE SYNC CODE
FRAME 1 MESSAGE DATA 1 2 3 4 5 ... 544 545 ... 577 578 ... 591 592
78, 80, 400

APPARATUS AND METHOD FOR FINE SYNCHRONIZATION OF A COMMUNICATION RECEIVER

BACKGROUND OF THE INVENTION

1. Field of the Invention

The present invention relates to communication receivers and more particularly to a method and apparatus for synchronizing digitally encoded data received by the communication receiver.

2. Background Discussion

Communications systems in general and paging systems in particular using selective call signalling have attained widespread use for calling a selected paging system receiver by transmitting information from a base station transmitter to the paging receiver. Modern paging receivers have achieved multifunction capability through the use of microprocessors which allow the paging receiver to respond to information having various combinations of tone, tone and voice, or digital encoded data messages. This information is transmitted using any number of paging coding schemes and message formats.

While there are several tone only and tone and voice signal decoding systems, the decoding of such information is generally not as difficult or as demanding as decoding those signals which use digitally encoded signals. Such digital systems are capable of a high volume of messages transmitted per unit of time because of the faster information rate they can transmit for addressing individual paging devices.

The digital information which is sent out in a digital communication system normally comprises a binary signal train which includes level transitions from a first level to a second level. These levels indicate the distinction between a binary zero and a binary one. It must also be a specific time duration which corresponds to a bit interval. The non-return-to-zero (NRZ) binary coding system generally used does not delineate bit intervals. It, therefore, is necessary to ascertain when an information bit begins or ends. Because of the variability of the nature of the information and an NRZ serial binary pulse train, several bit intervals could pass without the occurrence of a transition in the signal levels. Thus, it is generally not obvious from the information received at the receiver precisely when a bit interval begins or ends.

In digital paging systems, data are sent to a particular paging receiver by transmitting the paging receiver's unique address code followed by message data. These paging receivers are normally equipped with a microprocessor for decoding the data and with battery saver circuits which activate the receiver for periodic intervals of time for decreasing battery drain and increasing the battery life of the paging receiver. To keep the activation period of the battery at a minimum, these paging systems are synchronized to allow the receiver to precisely determine when information intended for the specific receiver is transmitted.

Additionally, the transmitter and receiver must be in synchronization so that bit address sequences and frames delineating information can be correctly decoded. Ideally, it is desirable to generate a timing signal which precisely corresponds to the occurrence of the center of the bit interval. The alignment between the timing signal and the center of the bit is crucial for proper decoding of the paging information.

In these paging systems, preamble information including address and synchronization signals is transmitted before message data. The preamble is typically transmitted at a slower transmission rate while the message data are transmitted at a faster transmission rate. Previous methods to synchronize the system, such as that in U.S. Pat. No. 4,414,676, sample the preamble at five times per bit. Thus, the initial phase alignment between the digital signals and the timing of the decoding means is only known within one fifth of a bit. This is typically satisfactory for decoding data at the slower preamble transmission rate. However, decoding the message data at a faster transmission rate causes misalignment which may result in the decoding means either dropping a received bit or adding an extra unwanted bit or decreasing the probability of correctly sampling the bit when noise is present. Furthermore, since synchronization occurs at the slower transmission rate, the faster transmission rate is constrained to an upper limit determined by the synchronization to the slower transmission rate so as to prevent dropping or adding bits.

Furthermore, slight differences between the frequencies of the transmitting and receiving clocks cause further misalignments which further increases the probability of the decoding means either dropping a received bit or adding an extra unwanted bit or decreasing the probability of correctly sampling the bit when noise is present. The longer the message is, the higher the probability that the transmitting and receiving clocks will eventually become misaligned. This problem is further magnified by a difference in the synchronization signal transmission rate and the data information transmission rate.

To partially overcome these problems, highly accurate clock circuits can be utilized in both the transmitter and receiver circuits, however, these are usually prohibitive because of cost, power available in the paging receiver, and initial frequency alignment problems. Operating the transmitter and receiver in different temperature environments can also cause their respective clock frequencies to drift apart.

SUMMARY OF THE INVENTION

The present invention has been developed for the purpose of alleviating the above mentioned problems of the prior art paging receivers. Accordingly, the invention has as one of its objects an apparatus and method for improving the decoding of information in a paging receiver system.

Another object of the present invention is to provide an apparatus and method for improving the accuracy in decoding data transmitted at a rate faster than synchronization data.

Another object of the present invention is to provide an apparatus and method for aligning a decoding means timing signal within a predetermined accuracy to a predetermined location on a waveform of transmitted digitally encoded signals.

In general, the method for synchronizing a communication receiver for receiving digitally encoded signals includes receiving the digitally encoded signals having a synchronization signal followed by message data. The synchronization signal includes a first portion and a second portion of the synchronization signal. A decoding means of the communication receiver is synchronized to the first portion of the synchronization signal for generating a timing signal in response thereof. The decoding means measures a phase relationship between the timing signal and the second portion of the synchronization signal and adjusts the timing signal within a predetermined accuracy to a predetermined phase relationship between the timing signal and the edge of the digital signal.

In particular, the synchronization signal is transmitted at a first transmission rate while the message data are transmitted at a second transmission rate. The second transmission rate can be faster than the first transmission rate. In the method, the first and second synchronization signal portions comprise a binary signal train having a sequence of digital waveforms. A time interval is computed based upon the timing signal generated by the decoding means synchronized to the first portion of the synchronization signal. The waveform of the second portion of the synchronization signal is sampled during the time interval to detect a predetermined location, such as an edge transition. The second portion waveform is sampled at a rate for achieving a predetermined accuracy for determining the actual occurrence of the edge transition. A time is computed upon detecting the actual occurrence of the edge transition in the time interval. A phase relationship is computed from this time. For each edge transition sampled, a phase relationship is computed. After a plurality of edge transitions are processed, a final phase relationship is computed from the plurality of edge phase relationship. The timing signal is then adjusted according to the final phase adjustment for synchronizing the timing signal to a predetermined location on the digital waveforms of the message data, such as the center of each message data waveform.

Another embodiment of the invention includes a second synchronization signal being transmitted at a third transmission rate. The third transmission rate can be greater than the first transmission rate to provide more edge transitions for statistically improving the computation of the final phase adjustment. Additionally, the second synchronization signal may be periodically transmitted without the first synchronization signal to maintain the accuracy of the timing signal.

BRIEF DESCRIPTION OF THE DRAWINGS

FIG. 1 is a circuit block diagram showing a communication receiver according to an embodiment of the inventor.

FIG. 2A is a view showing an example of transmitting grouped information received according to a predetermined message scheme by the communication receiver of FIG. 1.

FIG. 2B is an expanded view of one frame of words shown in FIG. 2A.

FIG. 2C is an expanded view of the synchronization signal of the frame in FIG, 2B.

FIG. 2D is an expanded view of the digital waveform of the second portion of the synchronization signal.

FIG. 2E is an expanded view of the digital waveform of message data following the synchronization signal.

FIG. 3 is a flow chart illustrating the foreground and background processing of the software which operates the communication receiver.

FIG. 4 is a more detailed flow chart for the foreground process.

FIG. 9A is a view showing an example of transmitted information by the communication receiver of FIG. 1 in a second embodiment of the present invention.

FIG. 9B is an expanded view of one frame of words shown in FIG. 9A.

FIG. 9C is an expanded view of the synchronization signals of the frame in 9B.

FIG. 9D is an expanded view of the digital waveform of the second portion the first synchronization signal of FIG. 9C.

FIG. 9E is an expanded view of the digital waveform for the second signal of FIG. 9C.

DETAILED DESCRIPTION OF AN ILLUSTRATED EMBODIMENT

I. General Description

Figure 5:
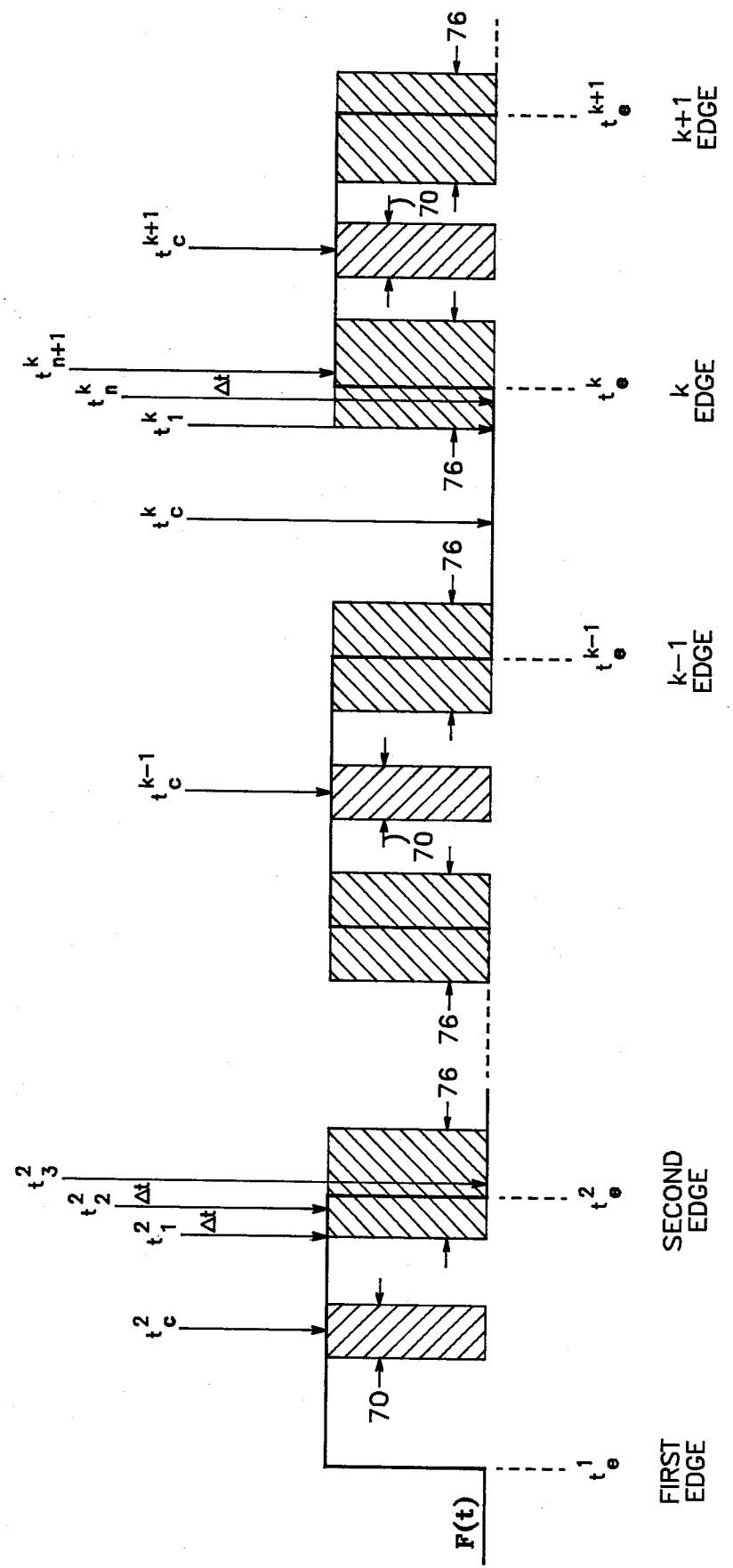
FIG. 5 shows signal waveforms for explaining the operation of the communication receiver to synchronize the decoding means to incoming information.

In order to best illustrate the utility of the present invention, it is described in conjunction with a communication receiver, such as a paging receiver, capable of receiving and decoding encoded information. While the present invention is described hereinafter with particular reference to a paging receiver, it is to be understood at the outset of the description which follows, it is contemplated that apparatus and methods, in accordance with the present invention, may be used with numerous other communication receiving systems.

The paging receiver described herein is associated with a paging system having a base station terminal, responds to coded data information from the base station terminal, and in turn, decodes, stores, and provides data messages to a user during operation. With reference to the drawings in general, there is illustrated a paging receiver 10 and a method for synchronizing a timing signal generated by a decoding means of the communication receiver for detecting and decoding digitally encoded signals transmitted from the base station terminal.

The method in one form of the present invention includes a method for synchronizing the decoding means by receiving digitally encoded signals transmitted to the communication receiver. The digitally encoded signals include a synchronization signal having a first digitally encoded portion and a second digitally encoded portion followed by message data. The decoding means is synchronized to the first portion of the synchronization signal for generating a timing signal. A phase relationship between the timing signal and the second portion of the synchronization signal is measured. The timing signal is adjusted to establish a predetermined phase relationship between the timing signal and the second portion of the synchronization signal. The phase relationship can be adjusted to obtain a predetermined phase relationship between the timing signal and the message data.

In particular, the synchronization signal includes a synchronization word 82 comprising a digital signal train 78 having a sequence of binary waveforms. The timing signal being first synchronized to the first portion 84 (preamble) of the synchronization signal is used for determining the occurrence of a predetermined location on the waveform of the second portion. A time interval 76 is computed as a function of the timing signal for sampling the second portion binary waveform at a first predetermined location on the waveform, such as the transition of the waveform from a first signal level to a second signal level (edge transition) 80. The second portion waveform is then sampled during the time interval 76 for determining the actual occurrence of the transition 80 of the waveform. The time for the actual occurrence of the transition of the waveform is then computed and the timing signal is adjusted based upon the time for the actual waveform transition to improve the accuracy of the timing signal for decoding the message data. The message data are then decoded using the improved timing signal.

In the apparatus of the present invention, a paging receiver 10 includes a decoding means 14, including a microprocessor 48, which performs the real time detecting and decoding function of the incoming paging information. This is accomplished by defining a plurality of tasks for the microprocessor to perform for effectively detecting, decoding, and processing the paging information. The plurality of tasks are divided into two or more groups corresponding to an incoming signal processing group (foreground process) and a receive signal processing group (background process). The foreground process is executed on a real time basis at a predetermined frequency according to the paging scheme. The background process is executed on a time available execution priority. During operation, the foreground process may interrupt the background process to schedule and execute foreground tasks. Typical foreground tasks include detecting the incoming paging information, synchronizing the decoding means to incoming paging information for properly decoding the paging information, and storing the paging information in a buffer or memory. Typical background tasks include reading the paging information stored in the buffer or memory, generating an alert according to the paging information and manipulating the paging information according to commands entered by the user. These commands may include request for displaying the paging information, deleting the paging information, and protecting the paging information.

The present invention deals with the foreground task of synchronizing the timing signal, generated by the decoder, to a predetermined accuracy for decoding the paging information. In the preferred form of the invention, the foreground task is accomplished by executing a series of predetermined instructions in the microprocessor. However, even though the present invention is described with reference to a microprocessor, it is to be understood at the beginning of this discussion that numerous other hardware and firmware implementations of the present invention may be utilized to accomplish the same results.

II. Paging Receiver

More particularly, and with specific reference to FIG. 1, there is shown a paging receiver 10 of the present invention including a receiving means 12, a decoding and controlling means 14, a memory means 16, a support means 18, a switching means 28, and an annunciating means 32-36. In FIG. 1, an antenna 20 receives information such as paging information. The antenna 20 is coupled to receiving means 12 that is subject to the control of decoding means 14. The decoding means 14 includes a microprocessor 48 that not only controls receiving means 12, but may also operate receiving means 12 on an intermittent basis to extend the life of a battery 30 through a battery saver circuit 22. Receiving means 12 outputs to decoding means 14 which has an address decoder for comparing received address words with address words contained in a code plug memory 24 for determining if the paging receiver has been activated and for preventing the paging receiver 10 from functioning if it has not been activated.

Basically, the code plug memory 24 is operatively coupled to the decoding means 14 such that when receiving means 12 receives paging codes and corresponding selected calling signals, the decoding means 14 actuates the code plug memory 24 and reads a unique code therein. If the received paging code matches the unique paging code from code plug memory 24, then the selective calling message associated with the received paging code is stored in memory 16. It is important to note that the decoding means 14 must operate to decode in real time paging information transmitted in a known paging scheme. That is, the timing of the decoding means is critical to decode received information. Inaccurate timing resulting from bad synchronization results in loss of data and can result in malfunction of the paging receiver.

The paging receiver of FIG. 1 has the capability of storing selective call data messages in memory 16 for providing them to support means 18 or display driver 50 for read out according to the state in which the switches of switching means 28 are set. A switch interface 26 provides input capability for switching means 28 to microprocessor 48. More specifically, the switching means 28 includes switches 40 and 46 for passing signals to the microprocessor 48 to control the alert annunciators 32, 34, and 36; switches 38, 40, and 42 to control the storage, protection, and retrieval of messages stored in memory 16; and on/off switch 41. Switch 46 allows the user to select one of several of the alert modes which typically comprise light emitting diodes 34, speakers 32, vibrators 36, or other annunciators.

In operation, microprocessor 48 generates internal data sampling signals synchronized to incoming data, decodes address data and compares the results with a predetermined address included in code plug memory 24 to process the message data, to store the message data, and to generate an alert that message data has been received. Microprocessor 48 communicates through bus 44 with other elements of the paging receiver by way of input/output ports 66. One of the output signals from the microprocessor 48 is applied to a display driver 50 for producing an alphanumeric display of data on display panel 52. Other output signals are supplied to support module 18 to selectively enable vibrator driver 54, alert lamp driver 56, or a transducer driver 58. Other signals are applied to battery saving unit 22 and switch interface 26. Microprocessor 48 also controls an alert generator 62 which causes tones produced by transducer driver 58 to be applied to speaker 32.

A clock signal, as derived from an oscillator 60, is applied to microprocessor 48, such as an MC146805L6 microprocessor manufactured by Motorola, Inc., to control the microprocessor to determine the rate at which the incoming paging information is sampled, synchronized, decoded, and processed. It is understood that microprocessor 48 uses oscillator 60 for controlling internal operations as well as interfacing with other elements of the paging receiver 100, such as timer/counter 64. Timer/counter 64 provides microprocessor 48 time interrupt information and includes the necessary hardware for effecting timing operations. The timer/counter 64 is normally an eight bit counter which can be used as an event counter to generate interrupt signals at certain software selected events or can be used for timing information. Attention is directed to FIGS. 4-7 for a detailed discussion of the cooperation between the timing control of microcomputer 48 and the synchronizing of the timing signal generated by the decoding means to the incoming paging information according to the present invention.

The microprocessor 48 is coupled by a data bus 44 to read only memory (ROM) 68 and by data bus 44 to a random access memory (RAM) 16. RAM 16 is adapted to store paging information messages which microprocessor 48 converts from received encoded paging information signals and processes these signals including decoding and appropriately storing the data messages in designated memory location areas of RAM 16. The programs or routines for operating microprocessor 48 are stored in ROM 68 and are explained generally with respect to FIGS. 4-7.

Microprocessor 48 is coupled to a voltage converting means 51 such as a DC-to-DC converter. Microprocessor 48 is also shown interconnected with a watchdog timer 59. Battery 30 is shown coupled to voltage converting means 51 for supplying power to the decoding means 14. It is to be understood that paging receiver 10 may operate on battery 30 only. However, in practice, an additional battery is necessary to provide the higher voltages required to operate microprocessor 48. The voltage converting means 51 eliminates the need for the additional battery by electronically providing a higher voltage than battery 30 can provide.

The voltage converting means 51, also responsive to decoding means 14, comprises an energy conservation means. When paging information is decoded, the decoding means identifies a decoding scheme which specifies those periods during which power may not be required to determine if the paging receiver has been addressed. Such times are established by the organization of the message scheme transmission format. One such typical transmission format is described and shown in FIG. 2. It is understood, however, that other transmission formats are capable of being used with the present invention. Moreover, the voltage converting means 51 provides an additional voltage necessary for operating the decoding means at higher voltage levels to support the high speed real time operation of microprocessor 48.

The voltage converting means 51 supplies power to memory 16, 68, and 24 and is responsive to microprocessor 48. Again, according to the predetermined coding scheme, at various times appropriate for the message formatting the decoded format, the voltage converting means may reduce the power supply to the system, thereby conserving the battery energy. Watchdog timer 59 functions to insure that there are no runaway execution conditions. In particular, microprocessor 48 is designed for providing a signal to the watchdog timer 59 on regular intervals. In the event that the watchdog timer 59 does not receive the signals at regular intervals due to a runaway execution condition in microprocessor 48, it forces a reinitialization routine included in ROM 68 to cause initialization of the microprocessor 48.

The output from receiving means 12 is connected to decoding means 14 for supplying the digital data to microprocessor 48. An additional output of receiving means 12 is also connected to annunciation transducer 32 by way of support module 18. Support module 18 includes tone decoders and audio amplifiers for tone and voice paging systems. Battery 30 is shown as providing power to the communication receiver by way of battery save 22. Battery saver 22 is also coupled to microprocessor 48 for preserving and extending the useful life of the battery by controlling the power supply to receiving means 12.

It is noted that the description of the paging operation given above is general in nature. More details of the pager operation are found in U.S. Pat. No. 4,518,961 entitled "Universal Paging Device with Power Conservation" assigned to the present assignee which disclosure is hereby incorporated by reference.

To briefly summarize, the paging receiver 10 recovers signals transmitted over a communication channel and supplies the signal to decoding means 14 which includes microprocessor 48. Microprocessor 48 decodes the recovered signal by determining if it contains a data pattern equivalent to one or more signal patterns stored in code plug memory 24. If a pattern match is detected, the microprocessor 48 activates an annunciator transducer and causes an appropriate alert to be generated to inform the user that a paging signal has been received.

In order to minimize the drain from the battery 30, microprocessor 48 is operated in two modes: a fully operational mode being a high power drain and a reduced computational mode being a reduced power drain. The fully operational mode includes synchronizing and decoding signals in real time while the reduced computational mode is employed during the interval to the next transition of a fully operational mode. To take full advantage of the power saving dual mode operation of the microprocessor, the voltage converting means 51 has two operational states that correspond to the two modes of the microprocessor. That is, the voltage converting means has a high output state which can supply power required to operate the decoding means in a high power drain mode and the reduced output state in which it can supply the power required to operate the coding in its low power drain mode.

III. Message Coding Scheme

FIG. 2 shows a diagram of the repetitive message coding scheme which would require synchronization of the type provided by the present invention. This system uses NRZ (non-return to zero) digital signal coding, instead of the selective calling signal of two sequential tones used by several other systems. The coded signal accesses individual paging devices to generate an alert signal that a message has been received for the person carrying the device.

Referring to FIG. 2A, the signals to all receivers may be divided into eight frames of information. Selective calling signals for a receiver within a frame are sent only for the corresponding duration of the individual frame signal. Thus, the message scheme format includes a synchronization signal 82 followed by a plurality of frames of data.

In this embodiment, FIG. 2B illustrates that the synchronization signal includes a preamble transmission 84 followed by a synchronization code 85 and eight frames 83 of data, each frame of data having a predetermined number of information words. In a batch mode, the transmission is terminated after eight frames of data. In an extended batch mode, after the eight data frames, another synchronization code and an additional eight data frames are appended to the transmission, the preamble not being retransmitted. Additional batches of data may be appended indefinitely in the extended batch mode.

Preferably, the preamble 84 or first portion of the synchronization signal includes alternating waveform levels (ones and zeros) transmitted at a predetermined bit rate such as 512 bits per second for a predetermined length of time such as 1062.5 ms, or 544 bits. The synchronization code 85 or second portion of the synchronization signal includes a predetermined bit pattern transmitted at a predetermined bit rate such as 512 bits per second for a predetermined period of time such as 62.5 ms or 32 bits of predetermined bit pattern. The synchronization code uniquely determines a location in the message scheme.

While the illustrated embodiment is described hereinafter with particular reference to transmission rates and length of transmission times, it is to be understood that other transmission rates and length of transmission times may be used in accordance with the present invention. For example, the preamble could easily be sent at 256 bps for 2125 seconds.

The message scheme code allows for at least two data transmission rates to coexist within a batch. Each frame can be assigned a unique address transmission rate. A slow speed frame may include two 32-bit address words, while a fast speed frame may include four 32-bit address words. For illustration, assume the slow transmission rate is 512 bps while the fast transmission rate is 1024 bps. Message information associated with an address is transmitted in subsequent frames at the same transmission rate as the corresponding address. Address information for a predetermined frame (and at a predetermined transmission rate) may commence only if message information from a previous address in an earlier frame is complete. FIG. 2C illustrates the digital signal train for the synchronization word 82 and the beginning of the first information word. The 577 bit synchronizing word 82 includes the 544 bit preamble 84 and 32 bit synchronization word code 85. The preamble 84 is used to first synchronize the internal clock (coarse synchronization) of each receiver to that of the received signal so that proper decoding of the synchronization code may be achieved. Thus, the desired synchronization which is achieved is between the local clock of the receiver and the broadcast clock of the transmitter.

The synchronization code portion uses a 32 bit code to indicate the position of selective calling signals. Each information word comprises a 32 BCH code composed of 21 bits for information and 15 bits for checking. As shown in FIG. 2C, the message data are transmitted at a transmission rate twice that of the preamble and synchronization code. In other words, the bit width of the message data are half the bit width of the preamble bit. It is noted that other transmission rates may be used for transmitting the synchronization signal and message data. However, for clarity in the discussion which follows, it will be assumed that the synchronization signal is transmitted at 512 bits per second while message data are transmitted at 1024 bits per second.

It may be appreciated that a variety of formats of information may be used for the preamble portion of the coding as indicated in FIG. 2C. The 1.0625 seconds of preamble which are used to achieve bit synchronization or coarse synchronization can be any number of patterns. However, for the purposes of explanation, the most commonly occurring pattern is a repetitive zero and one sequence for a predetermined number of bit positions (less than the length of preamble). Bit synchronization occurs by sampling each bit five times as described in U.S. Pat. No. 4,414,676, assigned to the present assignee of the present invention which disclosure is hereby incorporated by reference.

FIG. 2D represents the accuracy of the coarse synchronization after synchronizing to the preamble. At 512 bps, the bit width of the preamble is approximately 2.0 ms (actually 1.95 ms). After coarse synchronization, the accuracy of a sample window 70 is approximately 0.4 ms. (2.0 ms. divided by five samples). This makes the accuracy of the sample relative to the true bit center 72 to be ± approximately 0.2 ms. or ±10% of the bit width. The resulting degradation in signal to noise on recovered data for a well designed receiver if the sample is 0.2 ms. off center is given by the following formula:

$$20 \log \frac{(\sin(90 - (180 \times .10))}{\sin(90°)}$$

which results in a degradation in signal to noise of −0.43 dB. This degradation in signal to noise is within acceptable decoding limits.

FIG. 2E illustrates the accuracy of the sampling window 70 on message data transmitted at a transmission rate twice that of the preamble. In this case, the accuracy of the sample window 70 is still approximately 0.4 ms. However, this makes the accuracy of the sample relative to the true bit center 74 of the message data to be ± approximately 0.2 ms. or ±20% of the bit width. The degradation in signal to noise on recovery message data if the sample is 0.2 ms off center is given by the following formula:

$$20 \log \frac{(\sin(90 - (180 \times .20))}{\sin(90°)}$$

which results in a −1.84 dB degradation in signal to noise. This degradation in signal to noise is significant and can result in loss of data.

To improve the accuracy in synchronizing the decoding means to the message data, the decoding means samples the waveform of the digital signal train during the synchronization code detection task for locating the true center within a predetermined accuracy for the higher transmission rate of the message data. First, the microprocessor performs coarse synchronization on preamble, and second, it performs fine synchronization on the synchronization code.

Briefly, at initial turn-on, the decoding means microprocessor has no idea where data begins or ends. The microprocessor samples the received information during the preamble portion until bit or coarse synchronization is achieved. Note that since the received information may include various sections of alternating signal levels, the microprocessor must recognize a unique pattern in the signal train to determine exactly where it is with respect to the incoming information. Since the synchronization code portion includes a unique bit configuration, upon decoding the synchronization code portion, the microprocessor immediately determines where it is decoding information with respect to the received signal train. Essentially, the microprocessor will continuously sample the signal train after preamble until succeeding in code synchronization. To take advantage of processing time, fine synchronization is performed during synchronization code searching.

Fine synchronization results when the exact center of a bit is determined within a predetermined accuracy by locating a predetermined location of the waveform 78 such as the edge 80 for a plurality of bit waveforms. The location of the edge 80 is then statistically computed for all of the bit waveforms sampled and the timing signal from the decoding means is resynchronized to the statistically determined true center.

The waveform 78 is sampled during a time interval 76 at a rate such that the actual occurrence of the edge transition 80 can be computed within a predetermined accuracy. The beginning 75 of the time interval is computed from the center 72 of the waveform 78 after coarse synchronization. The sampling rate for the time interval 76 is computed according to the formula:

$$\text{Samples per Bit} = \frac{STR}{(\% \text{ accuracy} \times FTR)}$$

where STR equals the second transmission rate (bits per second) of the message data, percent accuracy equals the desired accuracy for decoding the message data, and FTR equals the first transmission rate of the synchronization signal in bits per second. For example, if the transmission rate of the synchronization signal is 512 bits per second, the transmission rate of the message data is 1024 bits per second, and the desired accuracy of decoding the message data is 10%, then the sampling rate in samples per bit for time interval 76 equals 1024 divided by (10% times 512) which equals 20 samples per bit. Thus, the time interval 76 is sampled at 20 samples per bit to determine any location of the bit within 10%.

Figure 10:
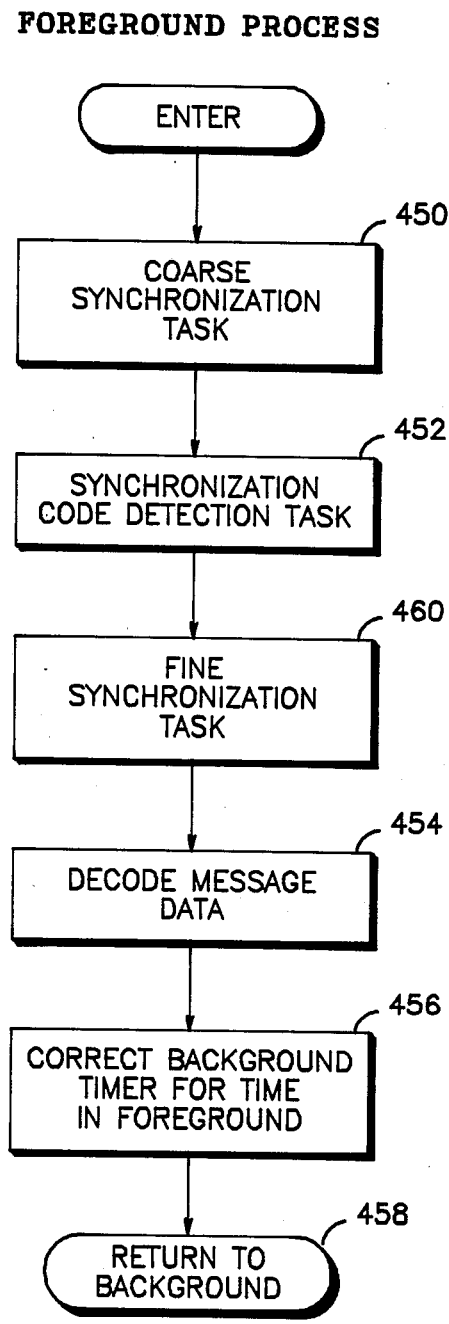
FIG. 10 is a flow chart of the foreground process for the second embodiment of the present invention.
Figure 11:
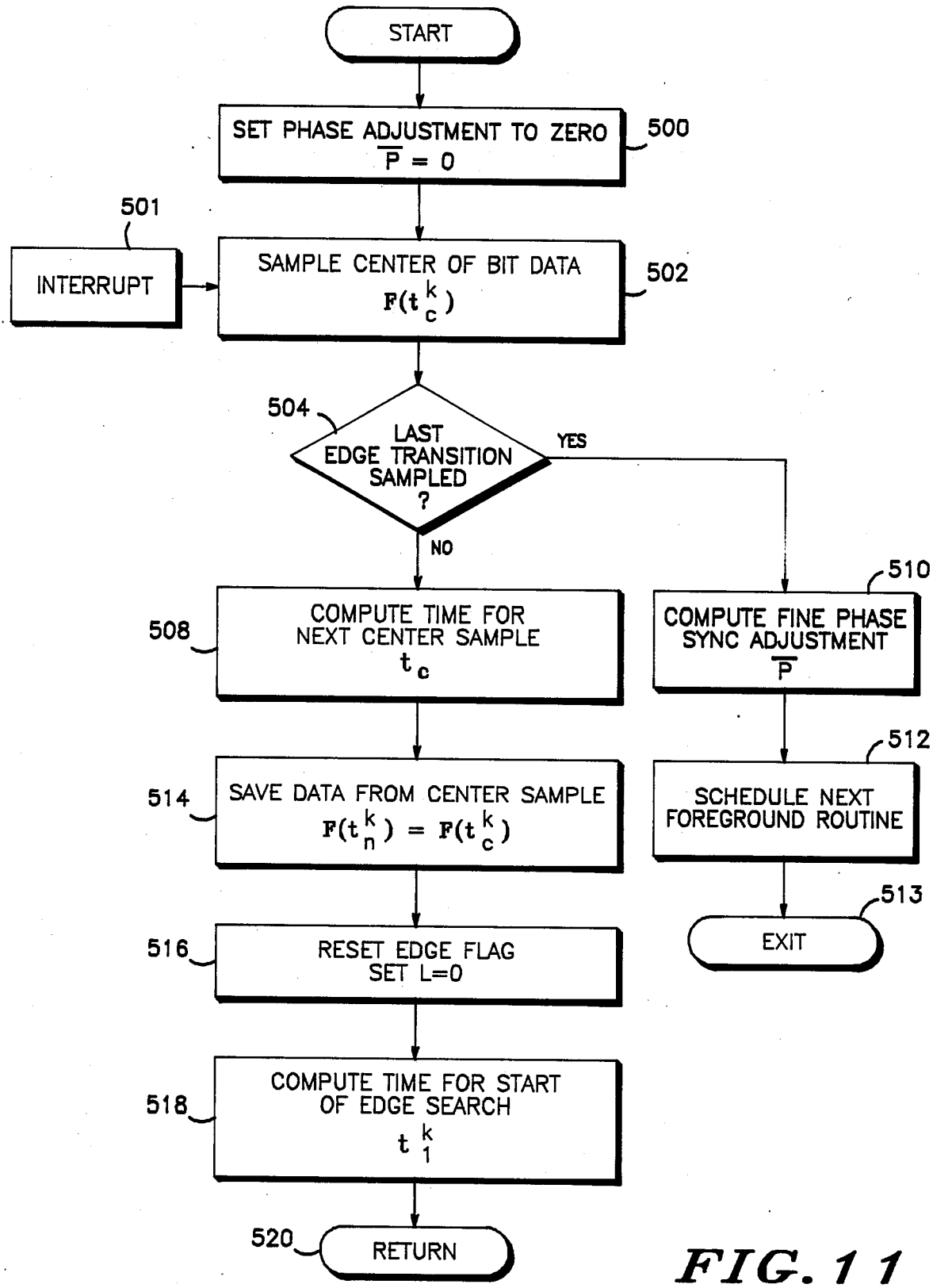
FIG. 11 is a detailed flow chart for the fine synchronization task of foreground process of FIG. 10.

This provides a fine synchronization for decoding the data message after the coarse synchronization. From a statistical standpoint, the accuracy of the fine synchronization is further improved by providing a greater number of a plurality of edge transitions to measure before the message data. In another embodiment of the present invention, a second synchronization signal is transmitted and received. The second synchronization signal includes a plurality of edge transitions at a rate greater than the initial transmission rate of the synchronization signal for improving the statistical computation of the final phase relationship. Reference is made to FIGS. 9-11 for a more detailed discussion of the second embodiment of the present invention.

IV. Operation

The operation of paging receiver 10 as shown in FIG. 1 will now be discussed in detail with regard to the flow chart shown in FIGS. 3-8. It should be noted that while the flow charts in FIG. 3-8 apply to a microprocessor implementation of the paging receiver shown in FIG. 1, this flow chart will also apply to a discrete component implementation of the paging receiver in which the functions of the microprocessor are duplicated by logic circuits.

The flow charts refer to the operation of programs for microprocessor 48. The programs are stored in ROM 68 in a predetermined sequence for causing the operation of microprocessor 48 to synchronize and decode incoming paging information, process the information, and display the information in an appropriate form. That is, ROM 68 stores a plurality of instructions defining a plurality of tasks. One such task detects, samples, and decodes the paging information received by the receiving means. Other routines for the operation of the paging receiver are included in the ROM 68, however, the routines are not described herein since they are not needed for the understanding of the present invention. The present invention relates to a method for synchronizing the decoding means to incoming paging information.

FIG. 3 illustrates the overall flow diagram for the decoding means of the paging receiver for decoding, displaying, and annunciating message data included in the paging information received by the paging receiver. The operating software of the decoding means separates into foreground and background processes. The foreground process includes foreground tasks for performing foreground functions such as detecting, sampling the data to synchronize the decoding means, and decoding data from the receiver. The background processes include those tasks or routines for storing, deleting, and displaying data messages stored in the microprocessor memory. The background processes are not described in detail since their exact operation is not needed for the understanding of the present invention.

In general, the tasks of the microprocessor are divided into two or more groups corresponding to the foreground process or an incoming signal processing group and the background process, such as a received signal processing group. The foreground process is executed on a real time basis for synchronizing and decoding the paging information according to a predetermined paging scheme. Since the foreground tasks operate in a real time basis, the operations performed by the microprocessor which relate to the detecting, synchronizing, and decoding tasks must be sufficiently rapid so that useful results are obtained in controlling the receiver without loss of information. The foreground processing time is significantly greater than idle time during foreground tasks. Thus, the background process is executed on a time available execution priority in which the incoming signal processing receives a higher priority execution schedule.

The background process is executed on a time available priority and is scheduled at least at a predetermined time interval such as 62.5 ms for the illustrated embodiment. Specific background tasks are scheduled depending upon the interaction of the user with the received paging information. For instance, the user may desire to display paging information that is stored in the memory of the microprocessor. To do this, the user would activate the read switch which would schedule a background task to read the paging information and display the information on the display means. During the execution of the background process, the foreground process may be scheduled and executed. Upon this occurrence, the background process is interrupted and the foreground process is scheduled in response to the incoming paging information signal.

The foreground task being prioritized detects the incoming paging information, synchronizes the decoding means timing signal to the information, decodes the paging information, and stores the paging information in a memory buffer for the background task. The basic foreground process involves cycling through battery saving, synchronizing, and decoding operations. When no signal is present, the foreground is in battery save state of operation. At predetermined intervals, depending upon the paging scheme, synchronization is attempted. If no synchronization signal is present and synchronization is not achieved within a predetermined interval, the foreground returns to battery saving operation. If a signal is present, synchronization is detected and the foreground tasks perform data decoding functions. Data decoding functions continue for the duration of the data transmission. After processing the foreground tasks, the background process is rescheduled and executed.

Specifically and with reference to FIG. 3, initially, the microprocessor is powered up, initialized, and housekeeping techniques well known in the art are performed to initialize registers, a foreground timer interrupt, and peripheral equipment connected to the microprocessor, step 100. The microprocessor goes into a low power state, waiting for a foreground timer interrupt, step 102. In the low power waiting state, the microprocessor is in a reduced computational ability mode in which it merely times the interval to the next transition to the high power state. While the microprocessor is in the low power wait state 102, a variable foreground timer interrupt will occur, step 104. The foreground timer interrupt is generated at a precise, predetermined time by the microprocessor's internal timer. In general, the precise interval is necessary for proper sampling of the incoming data. The time interval depends upon the foreground task schedule in process.

When a foreground timer interrupt is detected, the microprocessor is vectored to a foreground time interval task to process the interrupt and schedules a foreground task, step 105. After the interrupt is detected and any foreground task are processed, the foreground process returns back to the background process by an interrupt return 106 to determine whether the background process is to be executed. The background process is executed by examining a background timer, step 108. The background timer counts (either up or down) and when a predetermined value is reached, a known time interval has elapsed. In the illustrated embodiment, when 62.5 ms has elapsed and the background timer is equal to a predetermined value, such as zero, the background process is executed, step 110. If 62.5 ms has not elapsed, the microprocessor is vectored back to the low power wait state 102.

The background process 110 includes background tasks such as detecting switch activation, manipulating data messages, displaying data messages, deleting data messages, and reading data messages. The background process is a multi-task process having task scheduled according to the functions required for the operation of the paging receiver. During the background process 110, the foreground timer may interrupt the background process and schedule foreground task required for processing incoming paging information, steps 112-114. After the background process 110 is complete, the background timer is initialized (set to zero) and the microprocessor is placed in the low power wait state, step 102.

Referring to FIG. 4, upon an initial foreground timer interrupt occurring, the coarse synchronization task is executed, step 150. The coarse synchronization task repetitively samples the signal train of the incoming information. Eventually, the preamble is detected and coarse synchronization accomplished. Each of these samples during coarse synchronization is processed and combined with the output of a sequence correlator which determines the difference between the information contained in the sequence of the sampled incoming digital signal and a predetermined reference bit sequence. The timing signal adjustment is based on the derived information of the magnitude of the difference between the known and received bit sequence and the sample time period during which this information is derived. Synchronization of the decoding means to the incoming binary information with the preamble portion is achieved by making phase adjustments to the sampling clock which are functions both of the magnitude or dissimilarity in the time of measurement.

In particular, the coarse synchronization task samples at a rate of five samples per bit. Referring briefly back to FIG. 2D, the accuracy of the sample relative to the true center 72 is ± approximately 0.2 ms or ±10% for 512 bps. The degradation in signal to noise if the sample is approximately 0.2 ms off center is approximately 0.43 dB which is usually sufficient for recovering data at the transmission rate of the synchronization signal. However, since the data are sent at a higher transmission rate such as 1024 bps, the degradation in signal to noise is approximately $-1.84$ dB which is a significant degradation in signal to noise. The degradation results from a low sample rate relative to a higher transmission rate used for messages. After coarse synchronization, the synchronization code detection task is scheduled and executed, step 152. The synchronization code detection compares the sequences of the sampled bit pattern of the synchronization code with a predetermined sequence to produce an identification of detecting the synchronization code portion. Upon a positive identification that the synchronization code has been detected, message data can be decoded, step 154. To improve the synchronization of the communication receiver, the fine synchronization task occurs during synchronization code detection. The fine synchronization task uses the location of the edge transitions during the synchronization code detection for statistically computing the exact center of a bit more accurately and resynchronizing the microprocessor timing signal to the recomputed center location.

After message data are decoded, the time spent executing foreground tasks is added to the background timer. The background timer is typically turned off by the interrupt system of the microprocessor during foreground tasks. In this manner, the background timer accurately measures the time for executing the background process. The system is then returned to the background process, step 158.

Referring to FIG. 5, there is shown an expanded diagram of the signal train for the synchronization code word that is useful in explaining the operation of the fine synchronization task. In FIG. 5, F(t) corresponds to the waveform of the signal train for the synchronization code word. The time labelled $t_c$ corresponds to a timing signal interrupt computed from the coarse synchronization task. The coarse synchronization task provides the timing signal in which $t_c$ is computed for generating an interrupt in the foreground process which schedules synchronization code detection and the fine synchronization task. That is, at $t_c$, an interrupt is generated by the microprocessor in which the synchronization code detection task including the fine synchronization task are executed. As a result of the coarse synchronization, $t_c$ corresponds to the center of a bit waveform and is known only within interval 70. The superscript associates the times with an edge transition ($t_e$). For instance, FIG. 5 shows a first edge, $t_e^1$, second edge, $t_e^2$, $k-1$ edge, $t_e^{k-1}$, K edge $t_e^k$ and $k+1$ edge $T_e^{k+1}$ of the binary signal train of the synchronization code word.

The fine synchronization task computes a time interval 76 as a function of the timing signal $t_c$ for sampling the digital waveform F(t) at a first predetermined location on the waveform such as the edge ($t_e$) of a waveform. The task samples the waveform during the interval 76 for determining the actual occurrence of the predetermined location. Referring to the second edge, $t_e^2$, upon an interrupt at $t_c^2$ occurring at the center of the bit, the synchronization code detection task schedules the fine synchronization task to interrupt at $t_1^2$. At $t_1^2$, the fine synchronization task generates a series of interrupts or polls at (delta t) time apart for measuring the actual occurrence of the second edge at $t_e^2$. Note that when an edge transition ($t_e$) is detected, the value of the waveform F($t_e$) is unequal to the waveform value at the center F($t_c$). Thus, a quick and easy detection of the edge transition can be accomplished. Sampling a known transition of the bit waveform at a higher rate than the coarse synchronization improves the accuracy of the timing signal for the higher transmission rate of the message data. Reference will be continuously made to FIG. 5 for explaining the following flow charts which describe the method for fine synchronization.

Figure 6:
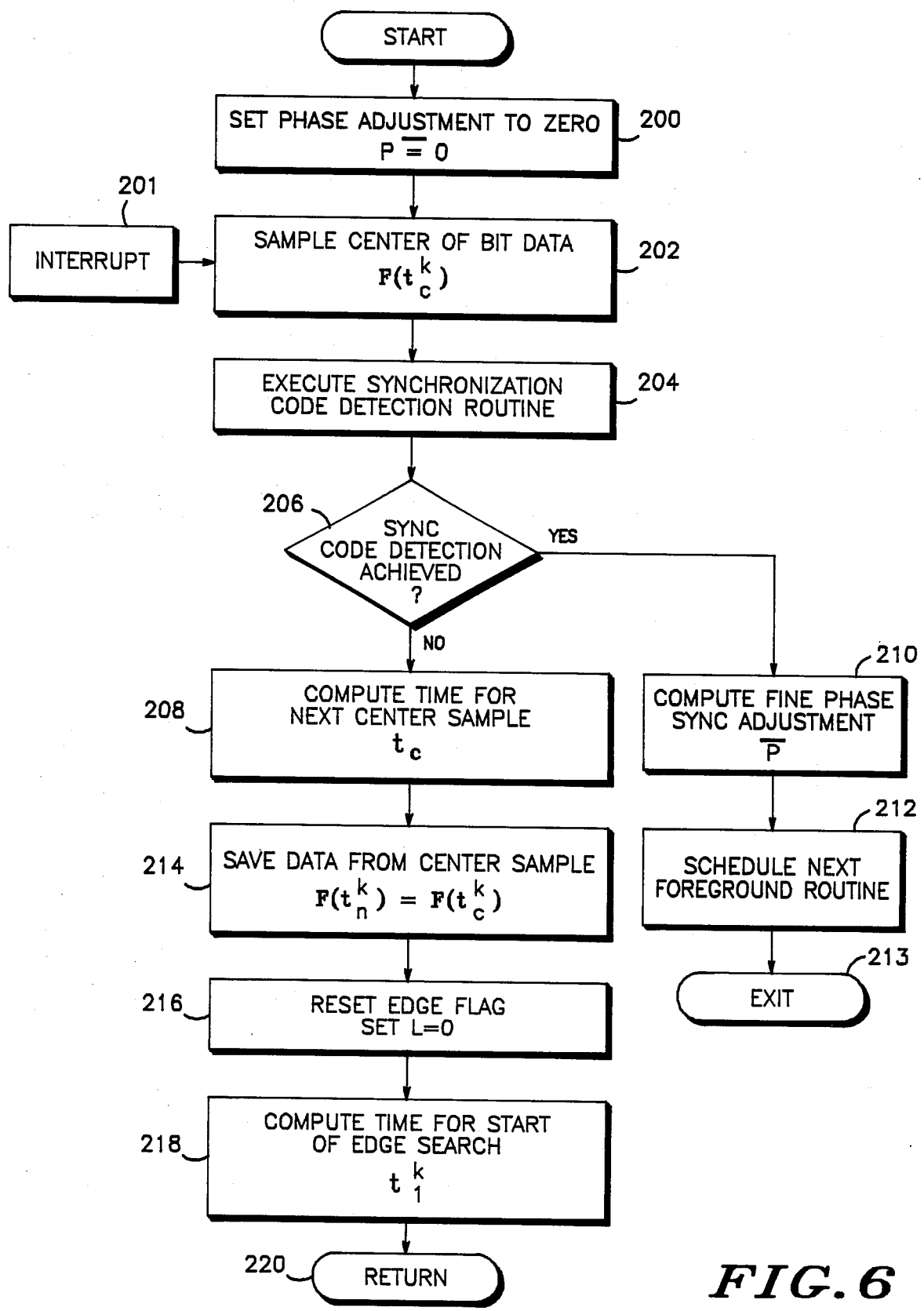
FIG. 6 shows a detailed flow chart for the synchronization code detection task of the foreground process.

Referring to FIG. 6, there is shown a flow chart for the synchronization code detection task including the fine synchronization task. The synchronization code detection task is a foreground task which is scheduled after the coarse synchronization task. The synchronization code detection task is described with reference to U.S. Pat. No. 4,414,676, the disclosure of which has already been incorporated by reference.

The fine synchronization task begins by setting a phase adjustment to zero, step 200. The phase adjustment is computed as a result of the fine synchronization task and is used to adjust the decoding means timing signal Since the coarse synchronization task computes $t_c$ within a known interval, the fine synchronization task is scheduled when the waveform is at $t_c$. At $t_c$, the fine task samples the center of the bit F($t_c^k$), step 202. Note that the center sample is either a high level signal (one) or a low level signal (zero), depending upon the bit configuration of the frame synchronization portion. The method then continues by executing the synchronization code detection as described in U.S. Pat. No. 4,414,676. Briefly, the synchronization code detection routine will return a positive indication that the specific bit configuration in the synchronization code portion of the synchronization word matches a predetermined configuration in the decoding means, step 204. A positive indication indicates that the microprocessor has decoded the incoming synchronization code word and is ready to decode message data, step 206.

Figure 8:
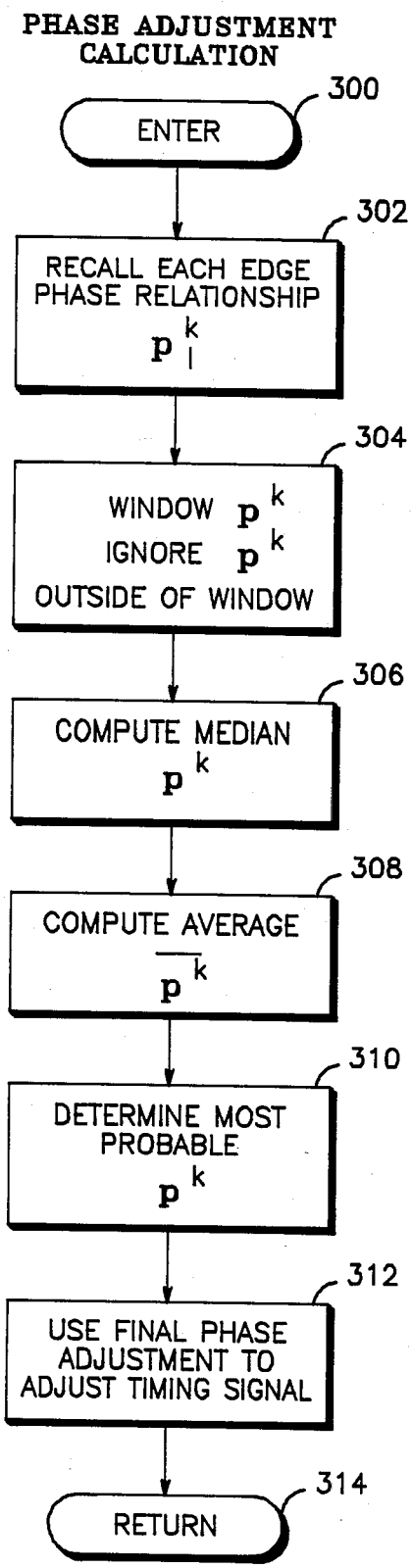
FIG. 8 shows a flow chart for computing the phase adjustment.

If synchronization code detection is achieved, the positive indication also indicates that the last bit of the synchronization code portion has been decoded. When synchronization code detection is achieved and the last edge transition is detected, a statistical computation for the final phase relationship is calculated, step 210. Reference is made to FIG. 8 for a detailed discussion of the computation of the final phase relationship. The final fine synchronization phase relationship is used to adjust the timing signal from the decoding means to properly decode the data messages at the higher transmission rate. After the timing signal is adjusted, the next foreground routine for decoding the message data is scheduled, step 212. The routine then exits.

Referring back to step 206, if synchronization code detection has not been achieved, then the method computes the time for the next center sample $t_c$. This time is stored in memory and used to compute an interrupt for the microprocessor to the next center sample, step 208. The data F($t_c^k$) from the center sample is saved for later decision making, step 214. An edge flag is reset and a counter L is set equal to zero, step 216. The edge flag indicates that an edge has been detected during the time interval 76. This interval is hereinafter referred to as edge search time interval. The time for the start of the edge search time interval 76 is then computed ($t_1^k$), step 218. The start time ($t_1^k$) for an edge search will occur before the occurrence of an edge so as to insure the transition of an edge during the edge search time interval 76. The start time for the edge search is used to generate an interrupt for the edge search routine. That is, when the start of time ($t_1^k$) is reached, the microprocessor will be interrupted and an edge search task is executed. Since the edge search is done by interrupts rather than by polling method, the microprocessor is able to return to the background process for executing a background task on a time available priority, step 220.

Figure 7:
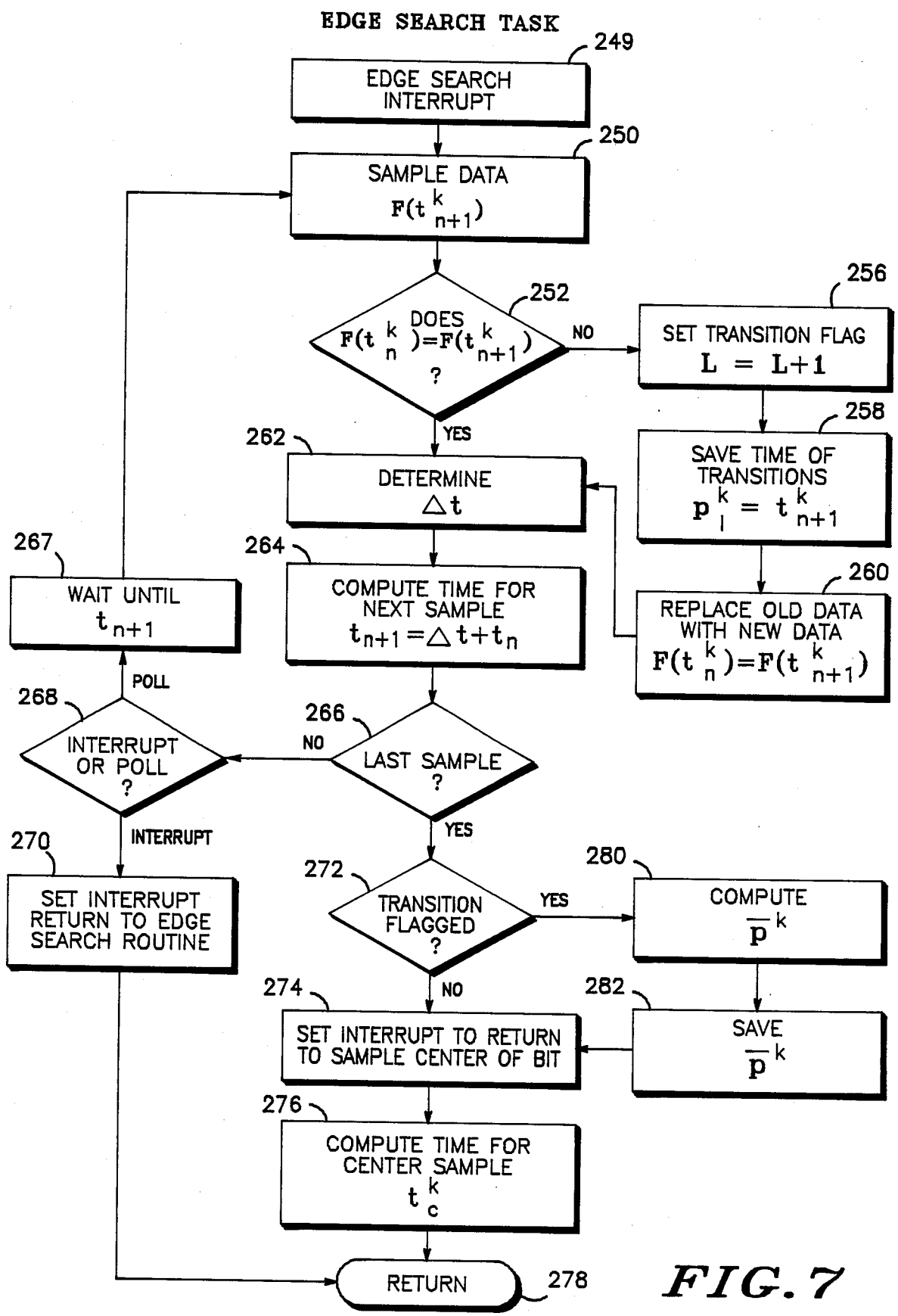
FIG. 7 shows a detailed flow chart for the edge search task included in the synchronization code detection task.

Referring to FIG. 7, there is shown a detailed flow chart of the edge search task in the foreground process. The edge search interrupt is generated when the interrupt timer reaches the start time ($t_1^k$) of the edge search time interval 76 computed in step 218 of FIG. 6. When time ($t_1^k$) is reached, the edge search task samples the bit waveform at either a predetermined rate or a variable rate. When the interrupt at ($t_1^k$) occurs, the waveform F(t) is sampled, step 252. The sampled data F($t_{n+1}^k$) are then compared to the sampled center data F($t_n^k$) saved from step 214 of FIG. 6, step 252. If the sampled center data equals the new sampled data, then a transition has not occurred. If the new sampled data does not equal the sampled centered data, then a transition has occurred.

When the new sampled data does not equal the center sampled data, a transition has occurred and the edge flag is set, step 256. In addition, a counter (L) is incremented. The counter (L) counts the number of transitions during an edge search time interval. The time of the transition detected is stored in memory, step 258. Please note that if noise is present in the system, then several transitions may occur during edge search time interval 76. However, only one actual edge transition will occur and the method determines which transition is the most probable edge transition.

Each time transition ($P_L^k$) is saved in memory so that, when the processing load of the microprocessor is lighter, the microprocessor determines the time for the edge transition and from that computes the phase relationship ($t_c-t_e$). If a transition has occurred, the old sample data are replaced with the new sample data, step 260. This step eventually determines if another transition occurs during the edge search time interval.

Referring back to step 252, if a transition does not occur (F($t_n^k$)=F($t_{n+1}^k$), the method then determines a new interrupt time for sampling the waveform, step 262. In one form of the invention, the interrupt time interval (delta t) can be kept constant so as to generate an equal sampling rate during the edge search time interval. However, it may be desirable to decrease the time between interrupts to provide a higher degree of accuracy in the actual occurrence of an edge transition. If this is desired, then the time increment for an interrupt is decreased so as to effect a higher sampling rate during the period of interest. Please note that based upon the paging scheme used, the method may desire to use a higher sampling rate to increase the accuracy of the synchronization. Additionally, the method can increase the interrupt interval if the method has already locked in on the edge transition and further data are to be ignored. It is important to note that the interrupt interval (delta t) is completely programmable.

After the interrupt interval has been determined, a new sample time is computed, step 264. The new sample time is equal to the interrupt interval plus the old interrupt time. The method then determines if this is the last sample during the edge search time interval. The last sample can be detected by either computing a last time for the edge search time interval or by counting the number of samples taken during the edge search time interval. If this is not the last sample, the method then determines if the remaining samples are determined by interrupt or polling, step 268. If the return is via interrupt, the new interrupt time is computed and the microprocessor is vectored to return to the edge search task 250, step 270. The method then exits, step 278. One advantage of an interrupt return is more time is available for the background process to be executed. However, it may be desirable to use a polling technique for sampling the edge search time interval for a maximum sampling rate. In this case, the microprocessor then waits for the next sampling time, step 267. The method then samples the waveform again, step 252.

Referring back to step 266, eventually, the last sample is reached and it is determined whether a transition has occurred during the edge search time interval by sensing the transition flag, step 272. If no transition has occurred, the microprocessor is vectored to return to the synchronization code search of FIG. 5, step 274. The interrupt time to sample the center of the next bit previously saved is then recalled, step 276. The time is loaded into the interrupt timer of the microprocessor and the edge search task returns to the background processing for executing any background tasks on a time available execution priority.

Referring back to step 272, when the transition is set, at least one transition has occurred during the edge search time interval. The method then computes the phase relationship for the edge, step 280. If only one transition is flagged during the edge search interval, the phase relationship for the edge is assumed to be the time of the single transition. However, if noise is present in the system, several transitions may have occurred during the edge search time interval. In this case, the phase relationship may be computed statistically such as an average of the number of transitions detected during a single edge search time interval. Alternatively, the phase relationship may be computed by other statistical methods.

In the practice of this invention, the Applicants have empirically discovered that the last transition time can be used for the edge transition. After the phase relationship is computed for this edge, the phase relationship for this edge is saved, step 282. The interrupt timer for the microprocessor is then set to interrupt at the center of the next bit, 274. Eventually, a plurality of phase relationships corresponding to the number of edges searched and detected will be stored in memory. Upon detecting the end of the synchronization code portion, a final phase adjustment for the timing signal of the decoding means is computed.

Referring to FIG. 8, there is shown a flow chart for computing the final phase adjustment from a plurality of phase relationships. The phase adjustment task of FIG. 8 is entered from step 210 of FIG. 6, step 300. Each edge phase relationship is recalled for each edge detected, step 302. Each edge phase relationship is checked to determine if the phase adjustment falls within a predetermined window, step 304. If the phase relationship does not fall within the window, the phase relationship computed is ignored for statistical purposes. This eliminates any "spikes" appearing in the phase relationship measure population which would severely degrade the computation of the final phase adjustment. If desired, the median of the edge phase relationships are computed, step 306. The median of the edge phase relationship population is defined as that value for which half the measurements of the edge phase relationship are less than the median and half are greater. In terms of a parent distribution, this means that the probability is 50% that any phase relationship measurement will be larger or smaller than the median. Depending upon the parent population of the phase relationship measurements, it may be desirable to use the median edge phase adjustment for computing the final phase adjustment to the timing signal. In yet another form of the invention, the average of the phase relationship measurements are used to compute the final phase adjustment to the timing signal.

In another form of the invention, the most probable value of the phase relationships is computed. The most probable value of the phase relationship measurements is that value for which the parent distribution of the edge phase adjustment measurements has its greatest value. In other words, for any given phase relationship measurement, this value is the one which is the most likely to be observed. Depending upon the computational time available for the microprocessor, one of the statistically computed phase relationship measurements is used to compute final phase adjustment. Upon determining the final phase adjustment, the method then adjusts the timing signal in a manner well known in the art, step 312. The method then returns to other foreground tasks for decoding the message data as received.

In a second embodiment of the invention, a second synchronization signal is included having a transmission rate faster than the first synchronization signal. Referring to FIGS. 9A-E, a fine synchronization portion 400 is transmitted with a transmission rate faster than the preamble or the synchronization code portion. Note that the transmission rate of the fine synchronization portion can be equal to or greater than the message data transmission rate. The faster transmission rate of the second synchronization signal permits more edge transitions to be sampled and detected to increase the accuracy of the fine synchronization. Since more edge transitions can be detected within a predetermined time, the accuracy of the statistical computation of the final phase adjustment is improved.

Referring specifically to FIG. 9E, since the center of the bit is known within the interval 402, the start time for the edge search time interval 404 is computed so as to insure an edge transition within interval 404.

Referring to FIG. 10, the overall foreground process proceeds as described with reference to FIG. 4 (steps 450-458), however, since the second synchronization signal follows the first synchronization signal, the fine synchronization task still continues after synchronization code detection, step 460.

Referring to FIG. 11, there is shown the flow chart for the fine synchronization task of the second embodiment of the present invention. Steps 500-502 are identical to steps 200-202 of FIG. 6 and the discussion of such is not repeated here. Since frame synchronization occurs before the last edge transition, the fine synchronization task determines if this is the last edge transition of the second synchronization signal, step 504. This is accomplished by either counting the edge transitions or by determining the time of the last edge transition for the second synchronization signal. If this is the last edge transition, the final phase adjustment is calculated as described previously, step 510. If this is not the last edge transition, the method proceeds to sample the waveform 400 during an edge search time interval 404 of the second synchronization signal, steps 508-520. The method then searches for the actual edge transition as described in FIG. 7. The second embodiment improves the accuracy of the final phase adjustment by providing a greater number of edge transitions to sample. This significantly improves the statistical computation of the final phase adjustment.

Thus, there has been shown an apparatus and method for adjusting a timing signal to establish a predetermined phase relationship between a timing signal and a digital signal for a decoding means of a communication receiver. The communication receiver receives digitally encoded signals, the digital signals including a synchronization signal having a first portion and a second portion. The method synchronizes the decoding means to the first portion of the synchronization signal for generating a timing signal in response thereof. The method then measures a phase relationship between the timing signal and the second portion of the synchronization signal within a predetermined accuracy. The timing signal is then adjusted to establish a predetermined phase relationship between the timing signal and the digital signal. A predetermined phase relationship may be a zero phase relationship in which the timing signal is used to periodically sample the digital signal.

While there has been shown and described what was at present considered to be the preferred embodiment of the present invention, modifications thereto will readily occur to those skilled in the art. It is not desired, therefore, that the invention be limited to the specific arrangement shown and described, but is intended to cover in the appended claims all such modifications that fall within the true spirit and scope of the invention.

What is claimed is:

1. A method for synchronizing a decoding means of a communication receiver, said method comprising the steps of:
   (a) receiving digitally encoded signals transmitted to the communication receiver, the digital signals including a bit synchronization signal
   (b) synchronizing the decoding means to the bit synchronization signal for generating a timing signal in response thereof;
   (c) measuring a phase relationship between the timing signal and a subsequent portion of the received digitally encoded signals; and
   (d) adjusting the timing signal on the basis of the measured phase relationship to establish a predetermined phase relationship between the timing signal and the remaining digitally encoded signals.

2. The method of claim 1 wherein the subsequent portion of the digitally encoded signals comprises a signal train having a sequence of digital waveforms and wherein step (c) of measuring further includes the steps of:
   (e) generating a first time interval as a function of the timing signal for sampling a digital waveform at an expected first predetermined location on the waveform;
   (f) sampling the waveform, during the first time interval, for determining the actual occurrence of the predetermined location;
   (g) computing the phase relationship between the actual occurrence of the predetermined location of the digital waveforms and the expected occurrence of the predetermined location of the digital waveforms; and
   (h) adjusting the timing signal based upon the phase relationship for synchronizing the timing signal to the occurrence of the first predetermined location on the waveform.

3. The method of claim 2 wherein step (e) of generating further includes the steps of:
   (i) sampling the waveform at a first rate for detecting a second predetermined location on the waveform;
   (j) computing the first time interval for an expected transition of the waveform based upon the second predetermined location on the waveform; and
   (k) searching for the transition of the waveform during the first time interval.

4. The method of claim 3 wherein step (k) of searching further includes the steps of:
   (l) sampling the waveform at a second rate faster than the first rate;
   (m) detecting any transition of the waveform during the first time interval;
   (n) computing the time for each transition;
   (o) determining from the transitions detected the time for actual waveform transition; and
   (p) computing the phase relationship based upon the time for the actual waveform transition.

5. The method of claim 4 wherein step (o) of determining further includes the step of assigning a last transition time as the actual waveform transition time.

6. The method of claim 4 wherein step (m) of detecting further includes the step of varying the second sampling rate to increase the probability of detecting the actual waveform transition time.

7. The method of claim 4 further including the steps of:
   (q) repeating from step (l) of sampling through step (p) of computing to generate a plurality of phase relationships corresponding to a plurality of sequential digital waveforms; and
   (r) statistically computing a final phase relationship from the plurality of phase relationships.

8. The method of claim 7 wherein step (r) of statistically computing further includes computing the average phase relationship for the final phase relationship.

9. The method of claim 7 wherein step (r) further includes computing the phase relationship for the final phase relationship.

10. The method of claim 1 wherein the subsequent digital signals further include message data being transmitted at a different rate than the bit synchronization signal.

11. The method of claim 1, wherein the subsequent portion of the received digitally encoded signals comprises a second portion of the bit synchronization signal.

12. The method of claim 11 further including the steps of:

(s) periodically transmitting the second portion of the bit synchronization signal; and (t) adjusting the timing signal in response to receiving the second portion of the bit synchronization signal to maintain the synchronization of the communication receiver.

13. A method for decoding information transmitted to a communication receiver, the information including a bit synchronization signal and message data having digitally encoded signals, the bit synchronization signal including a first digital synchronization portion and a second digital synchronization portion, the method comprising the steps of:

(a) sampling the information at a first sampling rate for decoding the first digital synchronization portion and generating a first timing signal in response thereof;

(b) sampling the second digital synchronization portion based upon the first timing signal for measuring a phase relationship between the first timing signal and the second digital synchronization portion;

(c) adjusting the timing signal with the phase relationship for generating a second timing signal; and (d) sampling the information with the second timing signal for decoding the digitally encoded signals of the message data.

14. The method of claim 13 further including the steps of:

(e) receiving the bit synchronization signal at a first transmission rate; and (f) receiving the digitally encoded signals of the message data at a second transmission rate.

15. The method of claim 14 wherein the bit synchronization signal comprises a sequence of digital waveforms and wherein step (b) of measuring further includes the steps of:

(g) computing a time interval, based upon the first timing signal, for an expected occurrence of a predetermined location on a digital waveform;

(h) sampling the digital waveform during the time interval for the actual occurrence of the predetermined location;

(i) computing a location time for the actual occurrence of the predetermined location; and (j) adjusting the second timing signal based upon the location time for synchronizing the second timing signal to the predetermined location on the digital waveform.

16. The method of claim 15 wherein step (h) of sampling further includes the step of sampling the digital waveform at a second sampling rate based upon the first transmission rate of the bit synchronized signal, the second transmission rate of the digitally encoded signals, and a predetermined accuracy.

17. The method of claim 16 wherein step (h) of sampling samples the digital waveform at the second sampling rate according to the formula:

$$\text{samples per bit} = \frac{\text{Second transmission rate}}{(\%\ \text{accuracy} \times \text{first transmission rate})}$$

18. A method for decoding information transmitted to a communication receiver, the information being digitally encoded signals including a first bit synchronization signal, a second bit synchronization signal and message data, said method comprising the steps of:

(a) sampling the information at a first sampling rate for decoding the first bit synchronization signal and generating a timing signal in response thereof:

(b) sampling the second bit synchronization signal at a second sampling rate with the timing signal for measuring a phase relationship between the timing signal and the second bit synchronization signal; and (c) adjusting the timing signal for establishing a predetermined phase relationship between the timing signal and the message data.

19. The method of claim 18, wherein step (b) of sampling further includes:

(d) receiving the second bit synchronization signal at a rate greater than the first bit synchronization signal;

(e) sampling the second bit synchronization signal for measuring the phase relationship between the timing signal and the second bit synchronization signal; and (f) adjusting the timing signal for establishing a phase relationship between the timing signal and the digitally encoded signals.

20. The method of claim 18, wherein the first and second bit synchronization signals comprise a sequence of digital waveforms and further including steps of:

(g) measuring the phase relationship between the timing signal and a predetermined location on the waveform for a plurality of waveforms;

(h) statistically computing a final phase relationship from the plurality of phase relationships; and (i) adjusting the timing signal with the final phase relationship to establish a predetermined phase relationship between the timing signal and the digitally encoded signals.

21. The method of claim 20 wherein step (h) of statistically computing further includes the step of computing the average of the plurality of phase relationships for determining a final phase relationship.

22. The method of claim 20 wherein step (h) of statistically computing further includes the step of computing a median value from the plurality of phase relationships to determine a final phase relationship.

23. The method of claim 20, wherein step (h) of statistically computing further includes the step of computing a most probable value from the plurality of phase relationships to determine a final phase relationship.

24. The method of claim 18, further including the steps of:

(j) receiving the first bit synchronization signal at a transmission rate different than the transmission rate of the message data; and (k) receiving the second bit synchronization signal at a rate different than the transmission rate of the message data.

25. The method of claim 24, wherein step (k) of receiving further includes the step of receiving the second bit synchronization signal at a rate equal to or greater than the transmission rate of the message data.

26. The method of claim 25 wherein step (j) of receiving further includes the step of receiving the first bit synchronization signal at a transmission rate lower than the transmission rate of the message data.

27. The method of claim 20 further including periodically receiving only the second bit synchronization signal to maintain the predetermined phase relationship between the timing signal and the message data.

28. An apparatus for decoding information transmitted to a communication receiver, the information having digitally encoded signals including a first bit synchronization signal and message data; the first bit synchronization signal including a first portion and a second portion; said apparatus comprising:
- a clock signal circuit for generating a clocking signal;
- means for sampling, responsive to said clocking signal, to sample the information at a first sampling rate to decode the first bit synchronization portion to generate a timing signal synchronized to the first bit synchronization portion;
- means for measuring, to sample the second bit synchronization portion, for measuring a phase relationship between the timing signal and the second bit synchronization portion; and
- means for adjusting the timing signal for establishing a predetermined phase relationship between the timing signal and the message data.

29. The apparatus of claim 28, wherein a second bit synchronization signal is received and said measuring means samples said second bit synchronization signal to improve the computation of the phase relationship between the timing signal and the message data.

30. The apparatus of claim 29, wherein the second bit synchronization signal is received at a transmission rate greater than the first bit synchronization signal.

31. The apparatus of claim 30 wherein the second bit synchronization signal is received to maintain the phase relationship between the timing signal and the message data.

* * * * *